(12) United States Patent
Yashiki et al.

(10) Patent No.: US 11,733,951 B2
(45) Date of Patent: Aug. 22, 2023

(54) IMAGE DISPLAY APPARATUS, IMAGE DISPLAY SYSTEM AND IMAGE DISPLAY METHOD

(71) Applicant: Honda Motor Co., Ltd., Tokyo (JP)

(72) Inventors: Tetsuya Yashiki, Wako (JP); Takashi Tetsuka, Wako (JP); Atsushi Ito, Wako (JP); Nanami Tsukamoto, Wako (JP); Shinichiro Yamauchi, Wako (JP); Tomoko Shintani, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 137 days.

(21) Appl. No.: 17/417,348

(22) PCT Filed: Nov. 11, 2019

(86) PCT No.: PCT/JP2019/044049
§ 371 (c)(1),
(2) Date: Jun. 22, 2021

(87) PCT Pub. No.: WO2020/137196
PCT Pub. Date: Jul. 2, 2020

(65) Prior Publication Data
US 2022/0075587 A1    Mar. 10, 2022

(30) Foreign Application Priority Data

Dec. 27, 2018 (JP) .................. 2018-243836

(51) Int. Cl.
*G06F 3/14* (2006.01)
*B60K 35/00* (2006.01)
(Continued)

(52) U.S. Cl.
CPC ............ *G06F 3/1423* (2013.01); *B60K 35/00* (2013.01); *B60K 2370/152* (2019.05);
(Continued)

(58) Field of Classification Search
CPC .... G06F 3/1423; G06F 3/1446; G06F 3/0481; G06F 3/0425; B60K 35/00;
(Continued)

(56) References Cited

U.S. PATENT DOCUMENTS

2010/0138149 A1* 6/2010 Ohta .................. H04M 1/6091
340/425.5
2013/0157572 A1* 6/2013 Gommier ........... H04N 1/00933
455/41.2

(Continued)

FOREIGN PATENT DOCUMENTS

JP     2000099871 A    4/2000
JP     2009194528 A    8/2009
(Continued)

OTHER PUBLICATIONS

International Search Report; Application PCT/JP2019/044049; dated Dec. 17, 2019.

*Primary Examiner* — Douglas M Wilson
(74) *Attorney, Agent, or Firm* — Duft & Bornsen, PC

(57) ABSTRACT

An image display apparatus includes a microprocessor configured to perform determining whether a position of a first device is a predetermined position, and controlling image displays on a first display portion provided at the first device and a second display portion provided at a second device in accordance with a determination result. The microprocessor is configured to perform the controlling including controlling image displays on the first display portion and the second display portion so that a predetermined image is displayed on the first display portion before it is determined that the first device is the predetermined position, and the predetermined image is displayed while gradually moving over time from the first display portion to the second display portion when it is determined that the first device is the predetermined position.

9 Claims, 8 Drawing Sheets

(51) Int. Cl.
*G09G 5/12* (2006.01)
*B60W 50/14* (2020.01)
*B60W 60/00* (2020.01)
*G09G 5/32* (2006.01)
G06F 3/042 (2006.01)
G06F 3/0481 (2022.01)
G05D 1/00 (2006.01)

(52) U.S. Cl.
CPC .... *B60K 2370/182* (2019.05); *B60K 2370/21* (2019.05); *B60K 2370/52* (2019.05); *B60K 2370/566* (2019.05); *B60K 2370/834* (2019.05); *B60W 60/005* (2020.02); *B60W 2050/146* (2013.01); *G05D 1/0011* (2013.01); *G06F 3/0425* (2013.01); *G06F 3/0481* (2013.01); *G09G 5/12* (2013.01); *G09G 5/32* (2013.01); *G09G 2340/0464* (2013.01); *G09G 2356/00* (2013.01)

(58) Field of Classification Search
CPC ........ B60K 2370/152; B60K 2370/182; B60K 2370/149; B60K 2370/21; B60K 2370/52; B60K 2370/566; B60K 2370/834; G09G 5/12; G09G 5/32; G09G 2340/0464; G09G 2356/00; H04M 1/00; B60W 60/005; B60W 2050/146; G05D 1/0011
See application file for complete search history.

(56) References Cited

U.S. PATENT DOCUMENTS

2015/0055564 A1\* 2/2015 Alam .................... H04W 84/12
 370/329
2019/0193749 A1\* 6/2019 Choi ...................... H04L 67/12

FOREIGN PATENT DOCUMENTS

| | | |
|---|---|---|
| JP | 2009236934 A | 10/2009 |
| JP | 2010068494 A | 3/2010 |
| JP | 2013130982 A | 7/2013 |
| JP | 2014127772 A | 7/2014 |
| JP | 2014153782 A | 8/2014 |
| JP | 2016529607 A | 9/2016 |
| WO | 2018110854 A1 | 6/2018 |

\* cited by examiner

LEFT ←——→ RIGHT

IMAGE DISPLAY APPARATUS, IMAGE DISPLAY SYSTEM AND IMAGE DISPLAY METHOD

CROSS-REFERENCE TO RELATED APPLICATION

This application is a National Stage of PCT international application Ser. No. PCT/JP2019/044049 filed on Nov. 11, 2019 which designates the United States, incorporated herein by reference, and which is based upon and claims the benefit of priority from Japanese Patent Application No. 2018-243836, filed on Dec. 27, 2018, the entire contents of which are incorporated herein by reference.

TECHNICAL FIELD

This invention relates to an image display apparatus, image display system and image display method configured to display an image on display portions.

BACKGROUND ART

Conventionally, there is a known apparatus of this type that is configured to display a specific character image on a display of a mobile terminal and a display of movable robot (for example, see Patent Literature 1). In the apparatus described in Patent Literature 1, the character image is displayed on the display of the mobile terminal in a command mode in which a user inputs a command, and the character image is displayed on the display of the robot in a guidance mode in which the user is guided.

CITATION LIST

Patent Literature

Patent Literature 1: Japanese Unexamined Patent Publication No. 2000-99871

DISCLOSURE OF INVENTION

Problems to be Solved by the Invention

However, in the apparatus of Patent Literature 1, at the time of switching from the command mode to the guidance mode, the user easily feels as if the character image moved instantaneously from the display of the mobile terminal to the display of the robot, and feels uncomfortable with respect to the change of the display.

Means for Solving Problem

An aspect of the present invention is an image display apparatus configured to control image displays on a first display portion provided in a first device carried by a user and a second display portion provided in a second device mounted on a vehicle, and the image display apparatus includes: a position detector configured to detect a position of the first device; and an electronic control unit having a microprocessor and a memory. The microprocessor is configured to perform determining a relative position of the position of the first device detected by the position detector with respect to the second device; and controlling the image displays on the first display portion and the second display portion in accordance with a determination result of the relative position. The microprocessor is configured to perform the controlling including controlling the image displays on the first display portion and the second display portion so that an image having a predetermined shape is displayed on the first display portion before it is determined that the position of the first device is a predetermined position where a distance from the first device to the second device is within a predetermined distance, the image having the predetermined shape is displayed while gradually moving over time from the first display portion to the second display portion when it is determined that the position of the first device is the predetermined position, and the image having the predetermined shape is returned to the first display portion when it is determined that the first device is located out of the vehicle.

Another aspect of the present invention is an image display system that includes a first device including a first display portion and carried by a user; a second device including a second display portion and mounted on a vehicle; a position detector configured to detect a position of the first device; and an electronic control unit having a microprocessor and a memory. The microprocessor is configured to perform determining a relative position of the position of the first device detected by the position detector with respect to the second device; and controlling image displays on the first display portion and the second display portion in accordance with a determination result of the relative position. The microprocessor is configured to perform the controlling including controlling the image displays on the first display portion and the second display portion so that an image having a predetermined shape is displayed on the first display portion before it is determined that the position of the first device is a predetermined position where a distance from the first device to the second device is within a predetermined distance, the image having the predetermined shape is displayed while gradually moving over time from the first display portion to the second display portion when it is determined that the position of the first device is the predetermined position, and the image having the predetermined shape is returned to the first display portion when it is determined that the first device is located out of the vehicle.

Further, another aspect of the present invention is an image display method configured to control image displays on a first display portion provided in a first device carried by a user and a second display portion provided in a second device mounted on a vehicle, and the image display method includes: detecting a position of the first device; determining a relative position of the position of the first device with respect to the second device; and controlling the image displays on the first display portion and the second display portion in accordance with a determination result. The controlling includes controlling the image displays on the first display portion and the second display portion so that an image having a predetermined shape is displayed on the first display portion before it is determined that the position of the first device is a predetermined position where a distance from the first device to the second device is within a predetermined distance, the image having the predetermined shape is displayed while gradually moving over time from the first display portion to the second display portion when it is determined that the position of the first device is the predetermined position, and the image having the predetermined shape is returned to the first display portion when it is determined that the first device is located out of the vehicle.

Effect of the Invention

According to the present invention, it is possible to change an image display between a first display portion of a first device and a second display portion of a second device in a manner that a user does not feel uncomfortable.

DESCRIPTION OF EMBODIMENT

Hereinafter, an embodiment of the present invention is explained with reference to FIGS. 1 to 9. Although an image display apparatus according to an embodiment of the present invention can be applied to mutually independent devices each having a display portion (monitor), an example in which the image display apparatus is applied to a user terminal carried by a user and a display device mounted on a vehicle will be described below.

Figure 1:
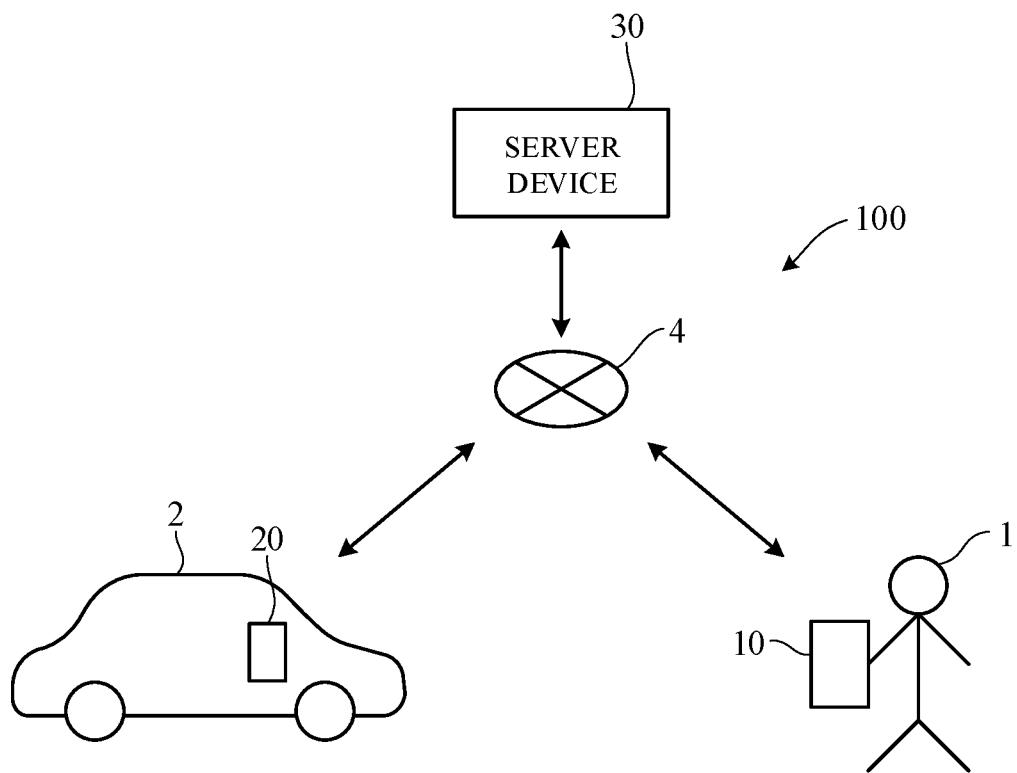
FIG. 1 is a diagram schematically illustrating an overall configuration of an image display system including an image display apparatus according to an embodiment of the present invention.

FIG. 1 is a diagram schematically illustrating an overall configuration of an image display system including an image display apparatus according to an embodiment of the present invention. As illustrated in FIG. 1, an image display system 100 includes a user terminal 10 carried by a user 1, a display device 20 mounted on a vehicle 2, and a server device 30.

The user terminal 10, the display device 20, and the server device 30 are connected to a network 4 including public wireless communication networks represented by the Internet, a mobile telephone network, and the like, and can communicate with each other via the network 4. The network 4 also includes a closed communication network provided for each predetermined management area, such as a wireless LAN or Wi-Fi (registered trademark), for example.

The user terminal 10 is configured by any type of mobile terminal that has a monitor as a display portion, such as a smartphone, a tablet terminal, a mobile phone, or a wearable terminal carried and used by the user 1. For example, the user terminal 10 is formed in a thin shape having a substantially rectangular shape as a whole, and a monitor is provided over substantially the entire one surface (see FIG. 4). The user terminal 10, which is a terminal unique to a user, has an identification ID (user ID) associated with the user 1 who utilizes the image display system 100.

Figure 2:
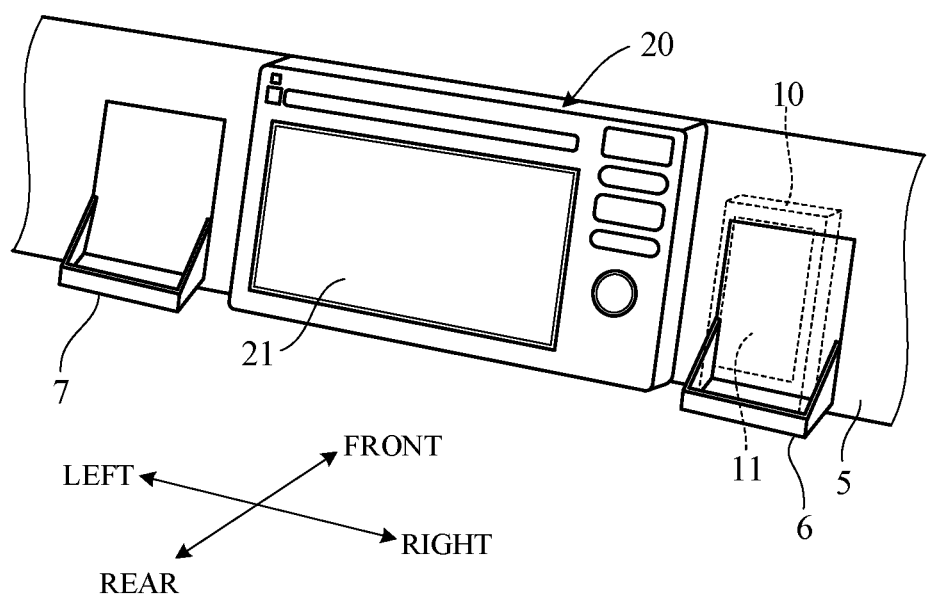
FIG. 2 is a perspective view illustrating a configuration inside a vehicle to which the image display system of FIG. 1 is applied.

The display device 20 includes, for example, a navigation device having a navigation function of guiding a route to a destination. FIG. 2 is a perspective view illustrating a part of an instrument panel 5 disposed in the front portion of the vehicle interior so as to face the driver. In FIG. 2, the front-rear direction and the left-right direction of the vehicle 2 are indicated by arrows. As illustrated in FIG. 2, a monitor 21 of the display device 20 is fixedly disposed at the center of the instrument panel 5 in the left-right direction. The monitor 21 has a substantially rectangular shape as a whole. Holders 6 and 7 for detachably holding the user terminal 10 are provided on the right side and the left side of the monitor 21, respectively. The user 1 riding in the vehicle 2 can place the user terminal 10 on the holder 6, 7 (for example, the holder 6) with the surface of the monitor 11 facing the user as indicated by a dotted line in FIG. 2. The holders 6 and 7 are fixedly provided in the vehicle 2. The holders 6 and 7 may be configured to be movable.

Figure 3:
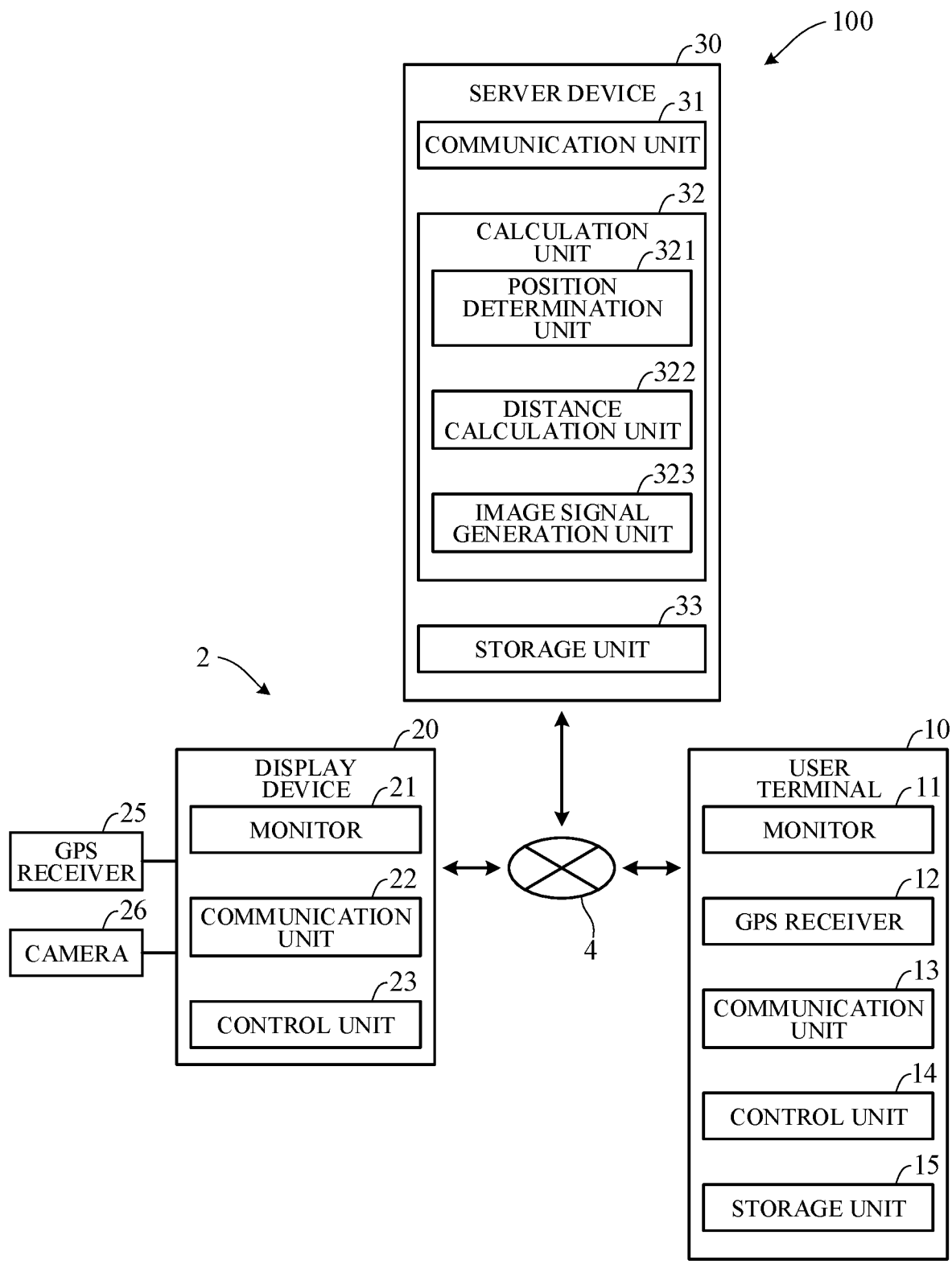
FIG. 3 is a block diagram illustrating an overall configuration of the image display system of FIG. 1.

FIG. 3 is a block diagram illustrating an overall configuration of the image display system 100. As illustrated in FIG. 3, the user terminal 10 includes a monitor 11 that displays various types of information, a GPS receiver 12 that detects an absolute position of the user terminal 10 on the basis of a signal from a GPS satellite, a communication unit 13 that performs communication via the network 4, a control unit 14 that controls each unit of the user terminal 10, and a storage unit 15 that stores user-specific information such as a user ID. Although not illustrated, the user terminal 10 further includes an input unit that inputs various commands and information. The input unit can be configured by a touch panel, a keyboard, and various sensors and devices such as an acceleration sensor, a microphone, and a camera. The user terminal 10 may include a display unit such as an indicator, a speaker, and the like.

Figure 4:
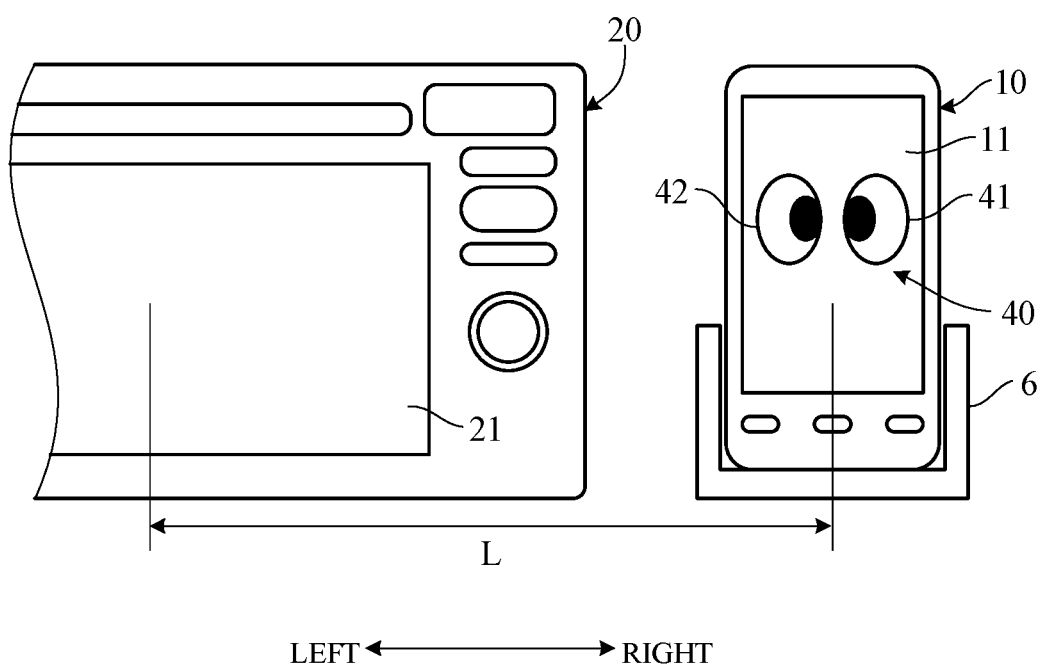
FIG. 4 is a diagram illustrating an example of an avatar image displayed on a monitor.

The user-specific information stored in the storage unit 15 includes an image of a predetermined avatar associated with the user 1, that is, an image personified as an alter ego of the user 1. This image is represented in the form of a predetermined character or agent, and is hereinafter referred to as an avatar image. FIG. 4 is a diagram illustrating an example of an avatar image 40 displayed on the monitor 11 of the user terminal 10. In FIG. 4, the user terminal 10 is disposed in the holder 6 on the right side of the display device 20.

As illustrated in FIG. 4, the avatar image 40 includes an image imitating the face of a character, more specifically, an image imitating the shape of a pair of left and right eyes (left eye image 41, right eye image 42). The avatar image 40 is not limited to this, and may not be divided into right and left, and may be an image divided asymmetrically. The image may be an image imitating a body having a part or all of a hand, a leg, and a torso instead of a face, and may be any image such as an image of an organism such as a human or an animal, or an image of a virtual organism that does not exist. The form of the avatar image 40 can be changed according to the user's preference.

The avatar image 40 is not always displayed, and is displayed at a predetermined timing when the user terminal 10 is in a predetermined state. For example, immediately after the user terminal 10 is placed in the holder 6, the avatar image 40 is displayed with a predetermined size at substantially the center of the monitor 11 as illustrated in FIG. 4. In a case where the user terminal 10 is not placed in the holder 6, the avatar image 40 may be temporarily displayed on the monitor 11 when the user terminal 10 is turned on, when the user terminal 10 receives a predetermined signal (for example, when an electronic mail is received), when a predetermined command is input to the user terminal 10, or the like. The avatar image 40 can also be displayed as a standby screen of the user terminal 10. The position and size of the avatar image 40 can be appropriately changed and displayed on the monitor 11. The display on the monitor 11 is controlled by the control unit 14.

As illustrated in FIG. 3, in addition to the display device 20, the vehicle 2 is provided with a GPS receiver 25 that detects an absolute position of the vehicle 2 on the basis of a signal from a GPS satellite, and a camera 26 that captures an image around the display device 20. By analyzing the image of the camera 26, the position of the user terminal 10 around the display device 20 and the distance from the user terminal 10 to the display device 20 can be detected. In a case where the absolute positions of the user terminal 10 and the display device 20 can be accurately detected by the GPS receivers 12 and 25, the position of the user terminal 10 around the display device 20 and the distance from the user terminal 10 to the display device 20 can also be detected on the basis of signals from the GPS receivers 12 and 25.

Signals from the GPS receiver 25 and the camera 26 are input to the display device 20. The display device 20 includes a monitor 21 that displays various types of information, a communication unit 22 that performs communication via the network 4, and a control unit 23 that controls each unit of the display device 20. Although not illustrated, the display device 20 further includes an input unit for inputting various commands and information and a storage unit for storing various information. The display of the monitor 21 is controlled by the control unit 23.

The server device 30 constitutes a part of the image display apparatus of the present embodiment. The server device 30 is configured as, for example, a single server or a distributed server including separate servers for each function. The server device 30 can also be configured as a distributed virtual server created in a cloud environment called a cloud server. The server device 30 includes a communication unit 31, a calculation unit 32 such as a CPU as an operational circuit, a storage unit 33 such as a ROM and a RAM, and another peripheral circuit (an interface circuit, etc.).

The communication unit 31 communicates with the user terminal 10 and the display device 20 via the network 4. The storage unit 33 stores a control program executed by the calculation unit 32, various threshold values used in the program, and the like. The storage unit 33 also stores information of the avatar image 40 associated with the user ID. The calculation unit 32 includes a position determination unit 321, a distance calculation unit 322, and an image signal generation unit 323 as functional configurations.

The position determination unit 321 detects the relative position of the user terminal 10 with respect to the display device 20 on the basis of signals from the GPS receivers 12 and 25 and the camera 26 acquired via the communication unit 31, and determines whether or not the user terminal 10 is placed in the holder 6, 7. A switch that is turned on when the user terminal 10 is placed may be provided in the holder 6, 7, and the position determination unit 321 may determine whether or not the user terminal 10 is placed in the holder 6, 7 on the basis of a signal of the switch.

As illustrated in FIG. 4, the distance calculation unit 322 calculates a distance L from the central portion of the monitor 11 of user terminal 10 disposed in holders 6, 7 to the central portion of monitor 21 of the display device 20 on the basis of the signals from the GPS receivers 12 and 25 and the camera 26 acquired via the communication unit 31. When the positions of the holders 6 and 7 with respect to the display device 20 are fixed, the distance L (fixed value) from the central portion of the monitor 11 to the central portion of the monitor 21 may be stored in advance in the storage unit of the display device 20, and may be transmitted to the server device 30. The distance L depends on the sizes of the monitors 11 and 21, and is set to, for example, about 0.1 m to 0.3 m.

When the position determination unit 321 determines that the user terminal 10 is placed in the holder 6, 7, the image signal generation unit 323 generates an image signal corresponding to the avatar image 40 to be displayed on each monitor 11, 21 on the basis of the distance L calculated by the distance calculation unit 322. More specifically, first, the form (shape or the like) of the avatar image 40 corresponding to the user ID included in the signal transmitted from the user terminal 10 is specified on the basis of the information of the correspondence relationship between the user ID and the avatar image 40 stored in the storage unit 33. Further, when the user terminal 10 is placed in the holder 6 on the right side, the distance L calculated by the distance calculation unit 322 is divided by a predetermined speed (image moving speed V) to calculate a moving time T (T=L/V). Then, the avatar image 40 (FIG. 4) displayed on the central portion of the monitor 11 of the user terminal 10 is gradually shifted to the left as time passes, and an image signal is generated so that the avatar image 40 is displayed on the central portion of the monitor 21 of the display device 20 after the moving time T.

In other words, an image signal for each predetermined time $\Delta t$ is generated as if the avatar image 40 gradually moves from the monitor 11 to the monitor 21 at a predetermined image moving speed V. For example, when the moving time T is 1 second and the image is updated every 0.1 seconds as the predetermined time $\Delta t$, the distance L is equally divided into 10, and an image signal corresponding to the position of the avatar image 40 every 0.1 seconds is generated. The image signal generated by the image signal generation unit 323 is transmitted to each of the user terminal 10 and the display device 20 via the communication unit 31. The image moving speed V is set to, for example, about 0.1 m to 0.3 m per second. The image moving speed V can be adjusted by the user operating an input unit provided in the user terminal 10 or the display device 20 for inputting various setting values.

Upon receiving the image signal from the server device 30, the user terminal 10 causes the avatar image 40 corresponding to the image signal to be displayed on the monitor 11 by processing in the control unit 14. When the display device 20 receives the image signal from the server device 30, the avatar image 40 corresponding to the image signal is displayed on the monitor 21 by processing in the control unit 23. As a result, the displays of the monitors 11 and 21 change.

Figure 5:
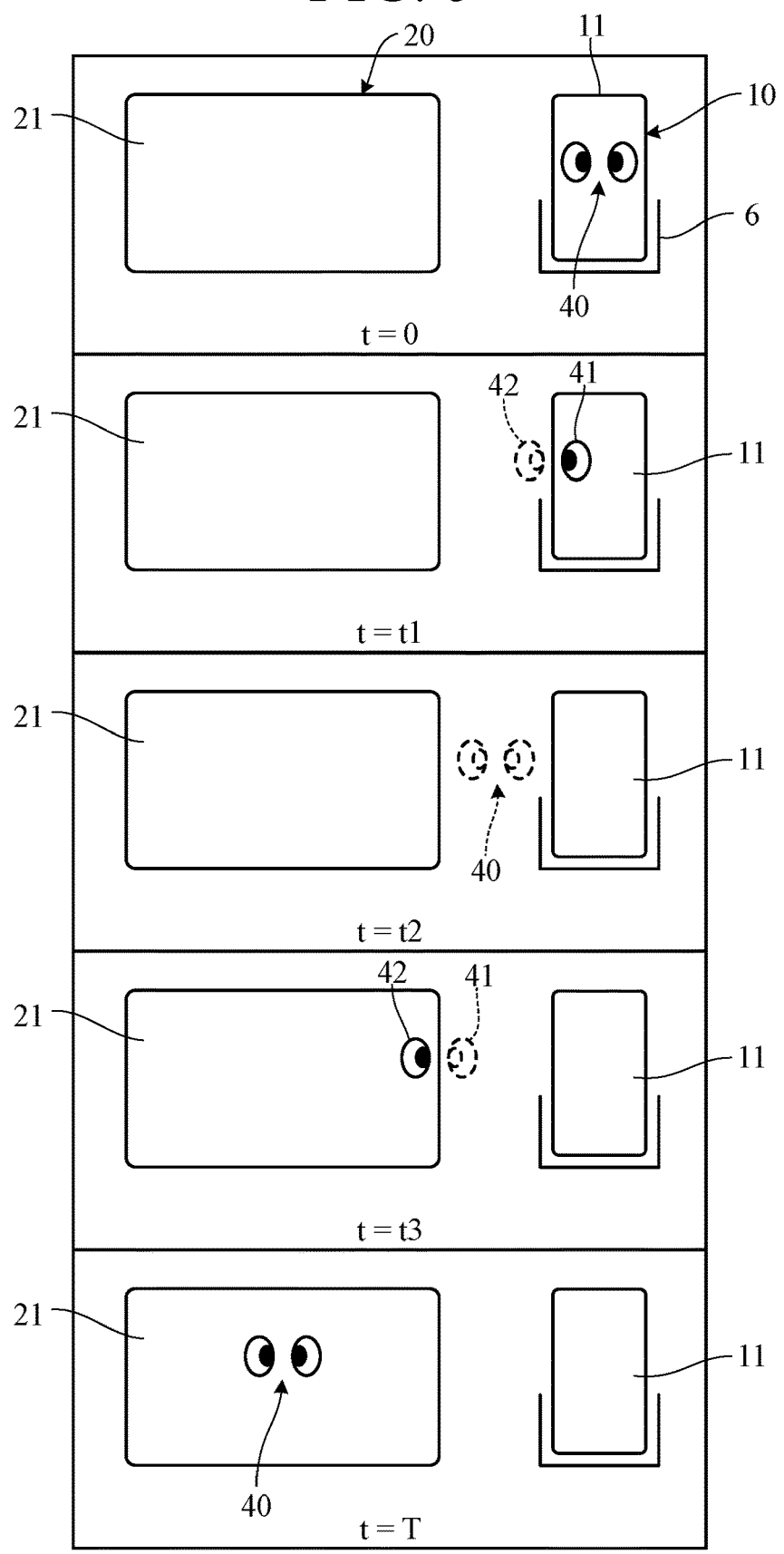
FIG. 5 is a diagram illustrating an example of a change over time of the avatar image displayed on the monitors.

FIG. 5 is a diagram illustrating an example of a change over time of the avatar image 40 displayed on the monitors 11 and 21. FIG. 5 is started from a state in which the user terminal 10 is placed in the holder 6 on the right side of the display device 20 in a state in which the user terminal 10 and the display device 20 are powered on. As illustrated in FIG. 5, at an initial point of time (t=0), an avatar image 40 is displayed at the center of the monitor 11 of the user terminal 10.

Thereafter, as time passes to t=t1, t2, t3, and T, the avatar image 40 gradually moves to the left side at a predetermined image moving speed V. For example, at time t1, the left eye image 41 is displayed at the left end of the monitor 11, and the right eye image 42 is erased from the monitor 11. That is, a part of the avatar image 40 is slid out from the monitor 11 toward the display device 20. At time t2, the entire avatar image 40 is slid out to the left from the monitor 11. At time t3, the right eye image 42 is displayed at the right end of the monitor 21. In other words, a part of the avatar image 40 is slid in from the user terminal 10 side (right side) to the monitor 21. Thereafter, at time T, the movement of the avatar image 40 is completed, and the entire avatar image 40 is displayed at the center of the monitor 21.

Figure 6:
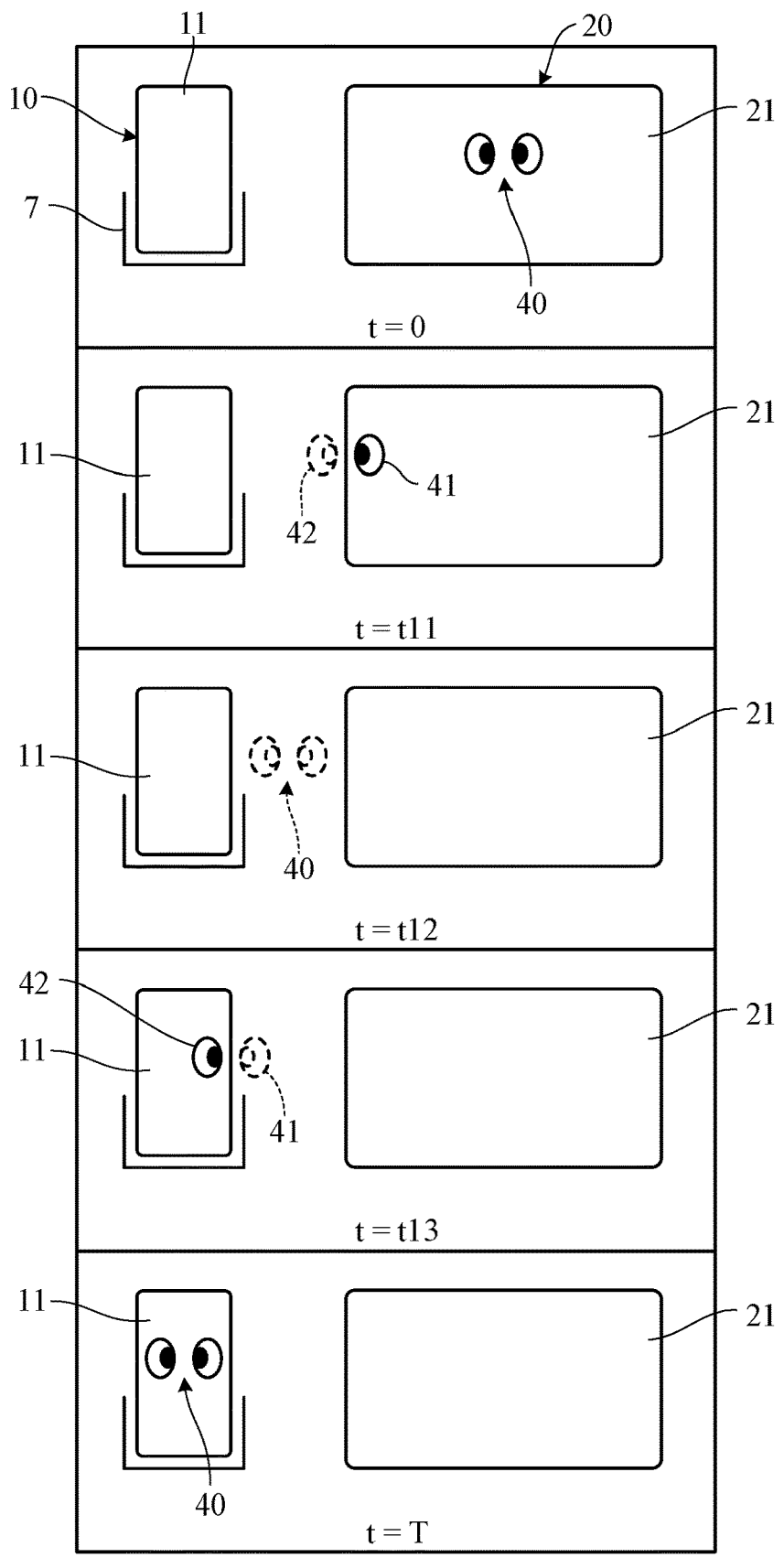
FIG. 6 is a diagram illustrating another example of a change over time of the avatar image displayed on the monitors.

After the movement of the avatar image 40 to the monitor 21 is completed, when the user terminal 10 is placed in the holder 7 on the left side (FIG. 2), the display of the avatar image 40 changes as follows. FIG. 6 is a diagram illustrating an example of a change over time of the avatar image 40 displayed on the monitors 11 and 21 in this case. FIG. 6 is started from a state in which the user terminal 10 is placed in the holder 7 on the left side of the display device 20 in a state in which the user terminal 10 and the display device 20 are powered on. As illustrated in FIG. 6, at an initial point of time (t=0), the avatar image 40 is displayed at the center of the monitor 21 of the display device 20.

Thereafter, as time passes to t=t11, t12, t13, and T, the avatar image 40 gradually moves to the left side at a predetermined image moving speed V. For example, at time t11, the left eye image 41 is displayed at the left end of the monitor 21, and the right eye image 42 is erased from the monitor 21. That is, a part of the avatar image 40 is slid out from the monitor 21 toward the user terminal 10. At time t12, the entire avatar image 40 is slid out to the left from the monitor 21. At time t13, the right eye image 42 is displayed at the right end of the monitor 11. That is, a part of the avatar image 40 is slid in from the display device 20 side (right side) to the monitor 11. Thereafter, at time T, the movement of the avatar image 40 is completed, and the entire avatar image 40 is displayed at the center of the monitor 11.

The image signal generation unit 323 generates an image signal corresponding to the display of the avatar image 40 described above. In FIGS. 5 and 6, the avatar images 40 displayed on the monitors 11 and 21 are set to have the same size, but the scale of the avatar image 40 may be changed according to the sizes of the monitors 11 and 21. After the avatar image 40 moves from the user terminal 10 to the display device 20, the display device 20 may take over the voice or the like set by the user terminal 10. That is, when various settings of the user terminal 10 are performed in association with the avatar image 40, the various settings such as the voice may be migrated to the display device 20 along with the movement of the avatar image 40.

Figure 7A:
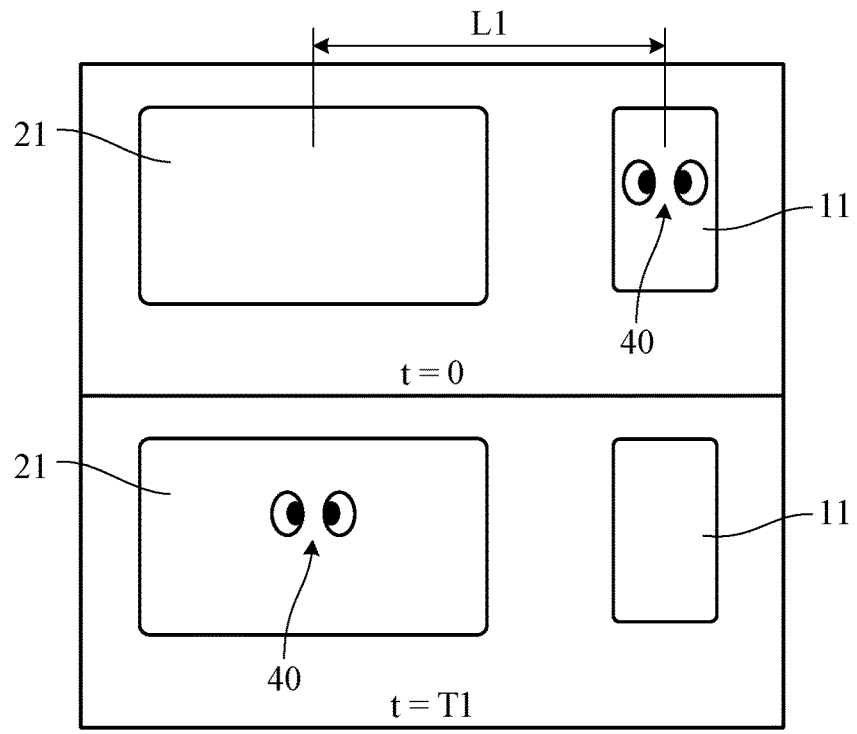
FIG. 7A is a diagram illustrating an example of the monitors with a short distance between the monitors.
Figure 7B:
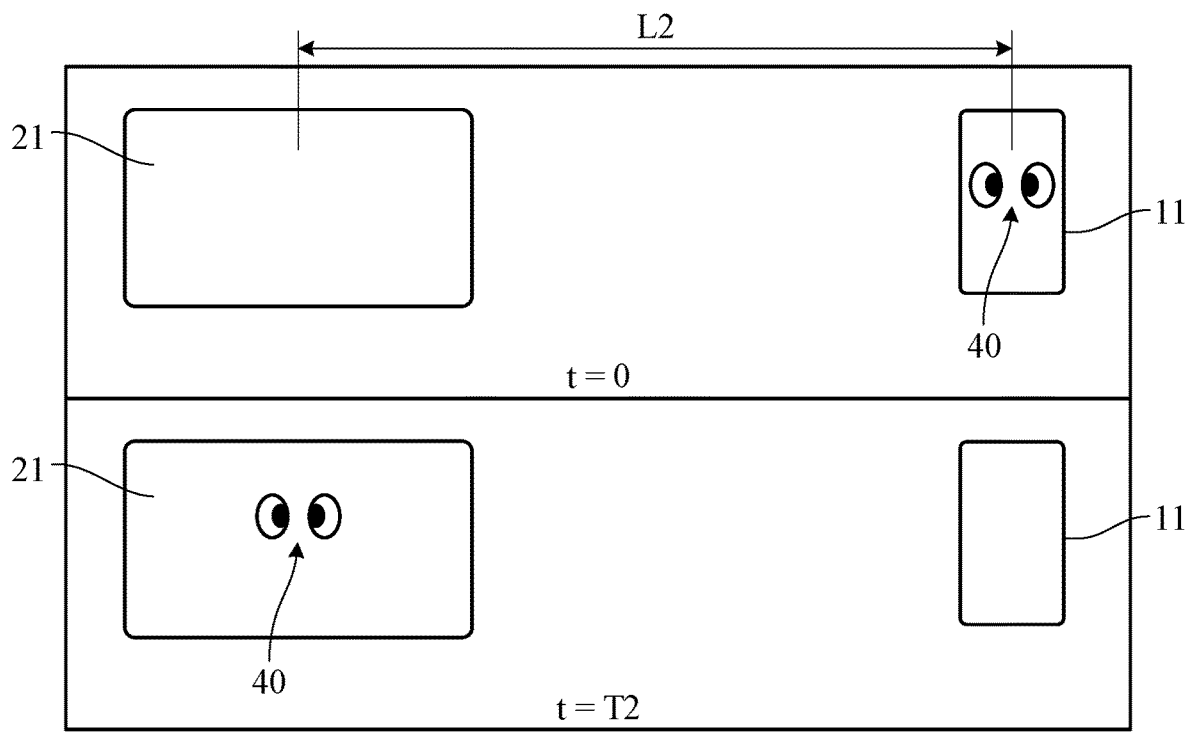
FIG. 7B is a diagram illustrating an example of the monitors with a long distance between the monitors.

The time T required for the movement of the avatar image 40 in FIGS. 5 and 6 becomes longer as the distance L between the monitor 11 and the monitor 21 becomes longer. For example, as illustrated in FIG. 7A, when the distance L between the pair of monitors 11 and 21 is L1, the moving time T of the avatar image 40 from the monitor 11 to the monitor 21 is T1. On the other hand, as illustrated in FIG. 7B, when the distance L between the pair of monitors 11 and 21 is L2 longer than L1, the moving time T of the avatar image 40 from the monitor 11 to the monitor 21 is T2 longer than T1.

Figure 8:
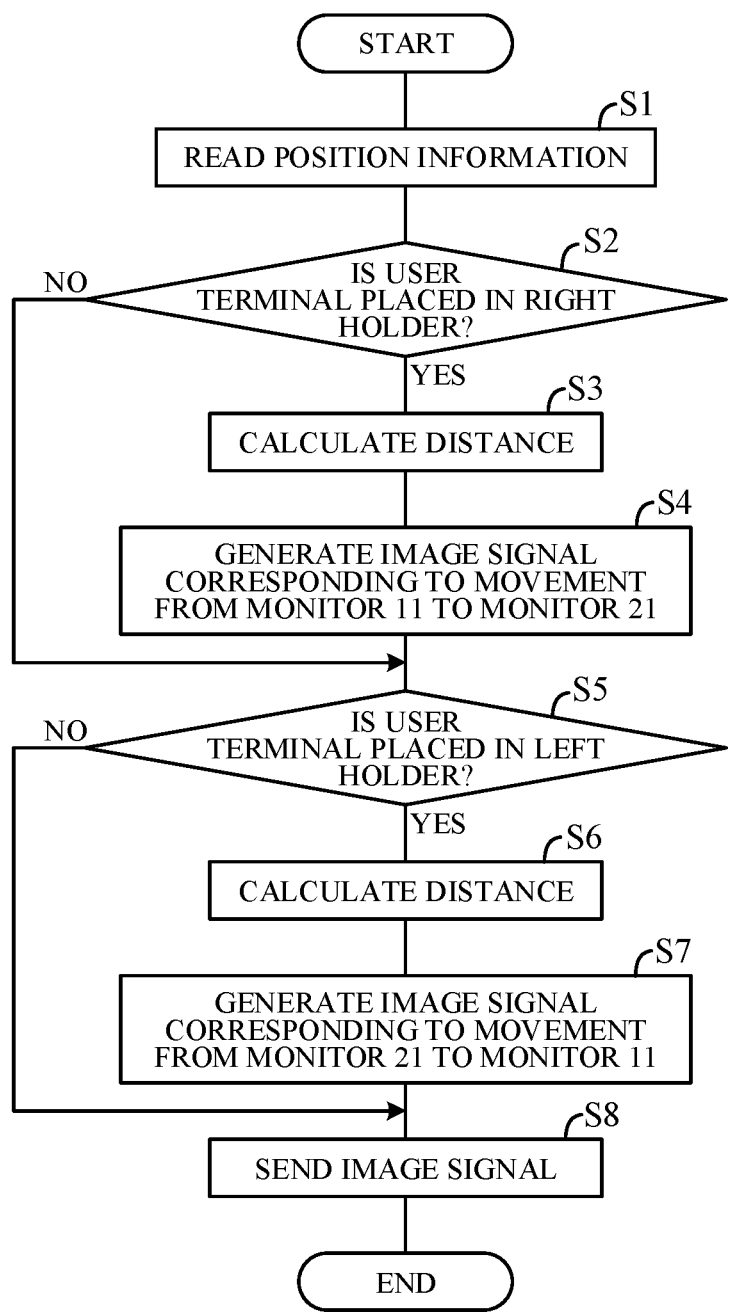
FIG. 8 is a flowchart showing an example of a process performed by the server device of FIG. 3.

FIG. 8 is a flowchart showing an example of a process performed by the calculation unit 32 (CPU) of the server device 30, according to a program stored beforehand. More specifically, it is a flowchart illustrating an example of a process related to the movement of the avatar image 40 from when the user 1 gets on the vehicle 2 to when the user 1 gets off the vehicle 2. The process illustrated in the flowchart is started, for example, when the display device 20 is powered on after the user 1 gets in the vehicle, and is repeated at a predetermined cycle. As illustrated in FIG. 8, first, in step S1, signals from the GPS receivers 12 and 25 and the camera 26 acquired via the communication unit 31 are read. That is, the position information of the user terminal 10 and the display device 20 is read. At this time, the user ID included in the information transmitted from the user terminal 10 is also read.

Next, in step S2, it is determined whether or not the user terminal 10 is placed in the holder 6 on the right side on the basis of the position information of the user terminal 10 and the display device 20. When the determination is affirmed in step S2, the process proceeds to step S3, and when the determination is negated, the process skips step 3 and step S4 and proceeds to step S5. In step S3, the distance L between the monitors 11 and 21 is calculated on the basis of the position information of the user terminal 10 and the display device 20.

Next, in step S4, an image signal corresponding to the avatar image 40 to be displayed on the monitors 11 and 21 every predetermined time Δt is generated on the basis of the calculated distance L and the predetermined image moving speed V. In this case, first, the avatar image 40 corresponding to the user ID is specified. Then, as illustrated in FIG. 5, the position of the avatar image 40 at every predetermined time Δt from the monitor 11 toward the monitor 21 is calculated, and an image signal corresponding to the position is generated.

Next, in step S5, it is determined whether or not the user terminal 10 is placed in the holder 7 on the left side on the basis of the position information of the user terminal 10 and the display device 20. When the determination is affirmed in step S5, the process proceeds to step S6, and when the determination is negated, the process skips step S6 and step S7 and proceeds to step S8. In step S6, as in step S3, the distance L between the monitors 11 and 21 is calculated on the basis of the position information of the user terminal 10 and the display device 20.

Next, in step S7, an image signal corresponding to the avatar image 40 to be displayed on the monitors 11 and 21 every predetermined time Δt is generated on the basis of the calculated distance L and the predetermined image moving speed V. In this case, first, the avatar image 40 corresponding to the user ID is specified. Then, as illustrated in FIG. 6, the position of the avatar image 40 at every predetermined time Δt from the monitor 21 toward the monitor 11 is calculated, and an image signal corresponding to the position is generated.

Next, in step S8, the image signal generated in step S4 or step S7 is transmitted to the user terminal 10 and the display device 20 via the communication unit 31. The control units 14 and 23 of the user terminal 10 and the display device 20 control the display of the monitors 11 and 21 according to the transmitted image signals, respectively. As a result, for example, as illustrated in FIGS. 5 and 6, the avatar image 40 is displayed on the monitors 11 and 21.

Figure 9:
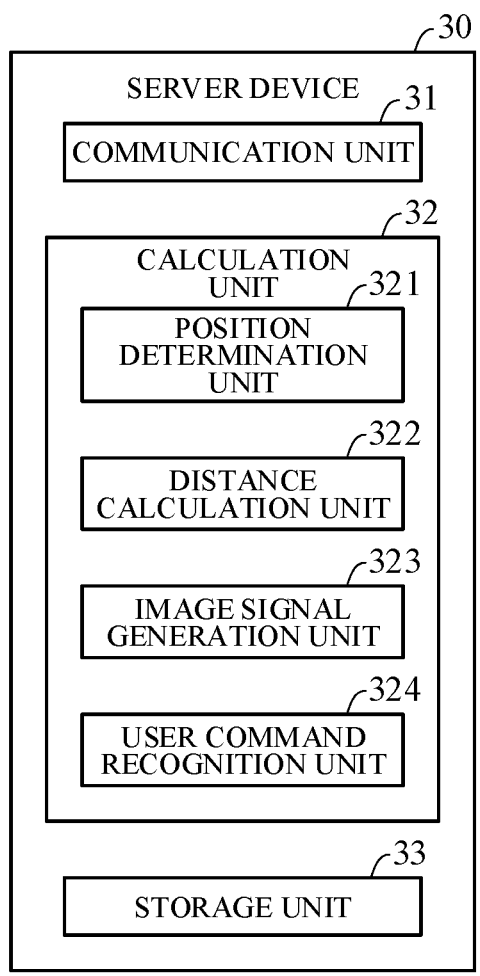
FIG. 9 is a block diagram illustrating a modification of the server device of FIG. 3.

As illustrated in FIG. 9, the calculation unit 32 of the server device 30 may include a user command recognition unit 324 that recognizes a command input from the user. In this case, before the processing of step S3 or step S6 is executed, the user command recognition unit 324 may determine whether or not there is a predetermined input by the user 1 to the input unit of the user terminal 10 on the basis of the information transmitted from the user terminal 10, and the process may proceed to step S3 or step S6 when it is determined that there is the predetermined input. That is, the server device 30 may generate the image signal on condition of a predetermined input by the user 1. The predetermined input in this case includes an operation input such as flick or tap on the touch panel, a voice input such as utterance of a voice command to the microphone, and a camera input such as a gesture in the field of view of the camera 26. As a result, the avatar image 40 can be moved at a timing desired by the user 1.

The operation of the image display apparatus according to the present embodiment will be described more specifically. A predetermined avatar image 40 is displayed on the monitor 11 of the user terminal 10 carried by the user 1 when the user terminal 10 is used or the like. Therefore, the user 1 already has a sense of closeness to the displayed avatar. When such a user 1 gets in the vehicle 2, places the user terminal 10 on the holder 6 on the right side, and starts to use the display device 20 having a navigation function or the like, the avatar image 40 displayed on the user terminal 10 gradually moves toward the display device 20 as time passes. Then, after the predetermined time T, the avatar image 40 is displayed at the center of the monitor 21 of the display device 20 (step S4).

As the avatar image 40 gradually moves in this manner, the user 1 can feel as if the avatar has transferred from the user terminal 10 to the display device 20 without discomfort. When the avatar image 40 moves to the display device 20, thereafter, the avatar image 40 is displayed always or at a predetermined timing on the monitor 21 of the display device 20. Therefore, the user 1 can feel close to the avatar while riding, and the comfort at the time of riding is enhanced. The movement of the avatar image 40 may be started when there is a predetermined input to the input unit of the user terminal 10 by the user 1, whereby the avatar image 40 can be moved at a timing desired by the user 1.

Thereafter, for example, when the user 1 gets off the vehicle 2, if the user terminal 10 is placed in the holder 7 on the left side, the avatar image 40 of the display device 20 gradually moves to the user terminal 10 side as time passes. Then, after the predetermined time T, the avatar image 40 is displayed at the center of the monitor 11 of the user terminal 10 (step S7). As a result, the user 1 can feel as if the avatar has returned from the display device 20 to the user terminal 10 without discomfort. Note that the movement of the avatar image 40 may be started when there is a predetermined input to the input unit of the user terminal 10 by the user 1, whereby the avatar image 40 can be moved at a timing desired by the user 1.

The present embodiment can achieve advantages and effects such as the following:

(1) An image display apparatus is configured to control a display of an image 40 on a monitor 11 provided in a user terminal 10 carried by a user 1 and a display of the image 40 on a monitor 21 provided in a display device 20 of a vehicle 2. The image display apparatus includes: GPS receivers 12 and 25 and a camera 26 detecting a position of the user terminal 10 relative to the display device 20; a position determination unit 321 determining whether the detected position of the user terminal 10 is a predetermined position, i.e., whether the user terminal 10 is placed in a holder 6 on a side of the display device 20; and an image signal generation unit 323 and control units 14 and 23 controlling the displays on the monitors 11 and 21 in accordance with a determination result by the position determination unit 321 (FIG. 3). The image signal generation unit 323 is configured to send image signal to the user terminal 10 and the display device 20 so that an avatar image 40 is displayed on the monitor 11 before it is determined by the position determination unit 321 that the user terminal 10 has been placed in the holder 6, and the avatar image 40 is displayed while gradually moving over time from the monitor 11 to the monitor 21 when it is determined that the user terminal 10 has been placed on the holder 6, and the control units 14 and 23 are configured to control the images on the monitors 11 and 21 in accordance with the image signal (FIGS. 5 and 8). With this configuration, the display of the avatar image 40 automatically and gradually moves from the monitor 11 of the user terminal 10 to the monitor 21 of the display device 20 without the user 1 inputting an image moving command by operating the user terminal 10, the display device 20, or the like. Therefore, it is possible to prevent the user 1 from feeling uncomfortable with the display of the avatar image 40.

(2) A server device 30 can be configured to include a user command recognition unit 324 recognizing a command input from the user (FIG. 9). In this case, the server device 30 is configured to send image signal to the user terminal 10 and the display device 20 so that the avatar image 40 is displayed while gradually moving over time from the monitor 11 to the monitor 21 or from the monitor 21 to the monitor 11 under a condition that an input of a predetermined command is recognized by the user command recognition unit 324. Therefore, it is possible to move the avatar image 40 at a timing desired by the user 1.

(3) The GPS receivers 12 and 25 and the camera 26 are configured to detect a relative position of the user terminal 10 with respect to the display device 20, and the position of the holder 6 as the predetermined position is set based on the position of the display device 20. Thus, the moving direction of the avatar image 40 can be defined according to the relative position between the user terminal 10 and the display device 20. That is, when the user terminal 10 is placed on the right side of the display device 20, it is possible to display the image so that the avatar image 40 of the user terminal 10 moves from right to left toward the display device 20 and moves (slid out) the outside of the monitor 11, and the avatar image 40 moves (slid in) from the user terminal 10 side into the monitor 21 of the display device 20. Therefore, the avatar image 40 smoothly moves, and the user 1 can recognize the movement of the avatar image 40 without feeling uncomfortable.

(4) The position determination unit 321 is configured to determine whether the user terminal 10 has been placed in the holder 7. The image signal generation unit 323 is configured to send image signal to the user terminal 10 and the display device 20 so that the avatar image 40 is displayed while gradually moving over time from the monitor 21 to the monitor 11, when it is determined by the position determination unit 321 that the user terminal 10 has been placed in the holder 7 after the avatar image 40 is displayed on the monitor 21 of the display device 20 in accordance with a determination by the position determination unit 321 that the user terminal 10 has been placed in the holder 6, and the control units 14 and 23 control the image displays on the monitors 11 and 21 in accordance with the image signal (FIGS. 6 and 8). Thus, the avatar image 40 automatically and gradually moves from the monitor 21 of the display device 20 to the monitor 11 of the user terminal 10, and the user 1 can return the avatar image 40 to the user terminal 10 without feeling uncomfortable.

(5) The holders 6 and 7 are disposed on opposite sides of the display device 20, that is, on both left and right sides of the display device 20. As a result, the avatar image 40 slid into the monitor 21 from the right end of the monitor 21 along with a placement of the user terminal 10 in the holder 6 on the right side, slides out of the monitor 21 from the left end of the monitor 21 when the user terminal 10 is placed in the holder 7 on the left side. Accordingly, the user 1 can intuitively grasp the operation of transferring the avatar image 40 from the user terminal 10 and the operation of returning the avatar image 40 to the user terminal 10. Further, since the moving direction of the avatar image 40 coincides with the riding direction of the user 1 from right to left, the user 1 does not feel uncomfortable with respect to the moving direction of the avatar image 40.

(6) The image display apparatus further includes a distance calculation unit 322 detecting a distance L from the user terminal 10 to the display device 20 based on signal from the GPS receivers 12 and 25 and the camera 26. The image signal generation unit 323 is configured to send image signal to the user terminal 10 and the display device 20 so that a time required for the movement of the avatar image 40 from the monitor 11 of the user terminal 10 to the monitor 21 of the display device 20 or from the monitor 21 to the monitor 11 becomes longer as the detected distance L becomes longer. This causes the display of the avatar image 40 to change in good agreement with the user's sense.

(7) The image display apparatus includes a holder 6 holding the user terminal 10 at a predetermined position. Therefore, when the movement of the avatar image 40 is started on condition that the user terminal 10 is placed in a predetermined position, the avatar image 40 can be moved with good timing.

(8) The display device 20 is mounted on the vehicle 2. When the user terminal 10 is held in the holder 6 on the side of the display device 20 as the user 1 rides, the avatar image 40 of the user terminal 10 is transferred to the monitor 21 of the display device 20, and the function of realizing the display of the avatar is handed over to the display device 20. The avatar image 40 is an image unique to the user 1, and the display device 20 continuously displays the avatar image 40. As a result, the user 1 can get the feeling of being together with the avatar during riding, and the comfortability for the user can be improved.

Although in the above embodiment, the image display system 100 is configured by the user terminal 10, the display device 20 and the server device 30, the image display system 100 can be also configured by the user terminal 10 and the display device 20, for example, with the display device 20 serving the function as the calculation unit 32 of the server device 30. The image display apparatus can be configured by omitting the server device 30. Therefore, among the image signal generation unit 323 and the control units 14 and 23, only the control units 14 and 23, may constitute a display control unit. Although in the above embodiment, the image display apparatus controls the image displays on the monitor 11 (a first display portion) of the user terminal 10 as a first device and the monitor 21 (a second display portion) of the display device 20 as a second device, the configurations of the first device and the second device are not limited to this.

Although in the above embodiment, the position of the user terminal 10, more specifically, a relative position of the user terminal 10 with respect to the display device 20 is detected by the GPS receivers 12 and 25 and the camera 26, the configuration of a position detector is not limited to this. Although in the above embodiment, the holders 6 and 7 are provided as a holder for holding the user terminal 10 at a predetermined position of the vehicle 2, the holder may be provided at the user's home. In this case, when the user 1 rides on the vehicle 2 after placing the user terminal 10 in the holding unit of user's home, the avatar image 40 may be displayed on the monitor 21 after a time T corresponding to the distance from the holder to the display device 20. Although in the above embodiment, the pair of holders 6 and 7 are placed on the left and right sides, they may be placed in the upper and lower sides. In this case, the avatar image 40 may be moved up and down. Although in the above embodiment, the avatar image 40 is displayed as an image of a predetermined shape on the monitors 11 and 21, but the image may have any form.

Although in the above embodiment, the holders 6 and 7 for placing the user terminal 10 are provided on the left and right sides of the display device 20, a first position and a second position corresponding to the positions of the holders 6 and 7 are not limited to the above configuration. Although in the above embodiment, the distance calculation unit 322 calculates the distance from the monitor 11 of the user terminal 10 to the monitor 21 of the display device 20 based on signals from the GPS receivers 12 and 25 and the camera 26, a distance detector may be any configuration. Although in the above embodiment, the avatar image 40 is returned to the user terminal 10 by placing the user terminal 10 in the holder 7, the avatar image 40 may be returned to the user terminal 10 by once removing the user terminal 10 from the holder 6 and then placing the user terminal 10 in the holder 6 again. When the camera 26 or the like detects that a predetermined time has elapsed since the user 1 left the vehicle 2, or when the sensor or the like detects that the parking brake of the vehicle 2 is activated, the avatar image 40 may be returned to the user terminal 10 automatically.

In the above embodiment, the image display apparatus which controls the image displays on the monitor 11 provided at the user terminal 10 carried by the user and the monitor 21 provided at the display device 20 is described. However, the present invention can be also configured as an image display method which controls image displays on a first display portion provided in a first device carried by a user and a second display portion provided in a second device.

The above explanation is an explanation as an example and the present invention is not limited to the above embodiment or modifications unless sacrificing the characteristics of the invention. The above embodiment can be combined as desired with one or more of the above modifications. The modifications can also be combined with one another.

REFERENCE SIGNS LIST 6,7 holder, 10 user terminal, 11 monitor, 12 GPS receiver, 14 control unit, 20 display device, 21 monitor, 23 control unit, 25 GPS receiver, 26 camera, 30 server device, 40 avatar image, 100 image display system, 321 position determination unit, 322 distance calculation unit, 323 image signal generation unit.

The invention claimed is:

1. An image display apparatus configured to control image displays on a first display portion provided in a first device carried by a user and a second display portion provided in a second device mounted on a vehicle, the image display apparatus comprising:
a position detector configured to detect a position of the first device;
a distance detector configured to detect a distance from the first device to the second device; and
an electronic control unit having a microprocessor and a memory, wherein
the microprocessor is configured to perform
determining a relative position of the position of the first device detected by the position detector with respect to the second device;
recognizing a command input from the user; and controlling the image displays on the first display portion and the second display portion in accordance with a determination result of the relative position; and wherein the microprocessor is configured to perform the controlling including controlling the image displays on the first display portion and the second display portion so that an image having a predetermined shape is displayed on the first display portion before it is determined that the position of the first device is a predetermined position where the distance from the first device to the second device is within a predetermined distance, the image having the predetermined shape is displayed while gradually moving over time from the first display portion to the second display portion when it is determined that the position of the first device is the predetermined position, and the image having the predetermined shape is returned to the first display portion when it is determined that the first device is located out of the vehicle, the microprocessor is further configured to perform the controlling including controlling the image displays on the first display portion and the second display portion so that the image having the predetermined shape is displayed while gradually moving over time from the first display portion to the second display portion when it is determined that the position of the first device is the predetermined position under a condition that an input of a predetermined command is recognized, and the microprocessor is further configured to perform the controlling including controlling the image displays on the first display portion and the second display portion so that a time required for a movement of the image having the predetermined shape from the first display portion to the second display portion or from the second display portion to the first display portion becomes longer as the distance detected by the distance detector becomes longer.

2. The image display apparatus according to claim 1, wherein the predetermined position is set in advance based on a position of the second device.

3. The image display apparatus according to claim 2, wherein the predetermined position is a first position, the microprocessor is configured to further perform determining whether the position of the first device detected by the position detector is a second position set based on the position of the second device, and wherein the microprocessor is configured to perform the controlling including controlling the image displays on the first display portion and the second display portion so that the image having the predetermined shape is displayed while gradually moving over time from the second display portion to the first display portion, when it is determined that the position of the first device is changed to the second position after the image having the predetermined shape is displayed on the second display portion in accordance with a determination that the position of the first device is the first position.

4. The image display apparatus according to claim 3, wherein the microprocessor is configured to perform the controlling including controlling the image displays on the first display portion and the second display portion so that the image having the predetermined shape is displayed while gradually moving over time from the second display portion to the first display portion when it is determined that the position of the first device is changed to the second position under a condition that an input of a predetermined command is recognized.

5. The image display apparatus according to claim 4, wherein the first position and the second position are set on both sides of the second device.

6. The image display apparatus according to claim 1, further comprising a holder configured to hold the first device at the predetermined position.

7. The image display apparatus according to claim 6, wherein the holder is configured to hold the first device in a state that the first display portion is directed to the user riding the vehicle.

8. An image display apparatus configured to control image displays on a first display portion provided in a first device carried by a user and a second display portion provided in a second device mounted on a vehicle, the image display apparatus comprising:

a position detector configured to detect a position of the first device; and an electronic control unit having a microprocessor and a memory, wherein the microprocessor is configured to perform determining a relative position of the position of the first device detected by the position detector with respect to the second device; and controlling the image displays on the first display portion and the second display portion in accordance with a determination result of the relative position; and wherein the microprocessor is configured to perform the controlling including controlling the image displays on the first display portion and the second display portion so that an image having a predetermined shape is displayed on the first display portion before it is determined that the position of the first device is a predetermined position where a distance from the first device to the second device is within a predetermined distance, the image having the predetermined shape is displayed while gradually moving over time from the first display portion to the second display portion when it is determined that the position of the first device is the predetermined position, and the image having the predetermined shape is returned to the first display portion when it is determined that the first device is located out of the vehicle, and the microprocessor is further configured to perform the controlling including controlling the image displays on the first display portion and the second display portion so that the image having the predetermined shape is displayed while gradually moving over time from the first display portion to the second display portion when a use of the second device is started under a determination that the position of the first device is the predetermined position.

9. An image display apparatus configured to control image displays on a first display portion provided in a first device carried by a user and a second display portion provided in a second device mounted on a vehicle, the image display apparatus comprising:
  a position detector configured to detect a position of the first device; and
  an electronic control unit having a microprocessor and a memory, wherein
  the microprocessor is configured to perform
  determining a relative position of the position of the first device detected by the position detector with respect to the second device; and
  controlling the image displays on the first display portion and the second display portion in accordance with a determination result of the relative position; and wherein
  the microprocessor is configured to perform
  the controlling including controlling the image displays on the first display portion and the second display portion so that an image having a predetermined shape is displayed on the first display portion before it is determined that the position of the first device is a predetermined position where a distance from the first device to the second device is within a predetermined distance, the image having the predetermined shape is displayed while gradually moving over time from the first display portion to the second display portion when it is determined that the position of the first device is the predetermined position, and the image having the predetermined shape is returned to the first display portion when it is determined that the first device is located out of the vehicle, and
  the microprocessor is further configured to perform
  the controlling including controlling the image displays on the first display portion and the second display portion so that a moving direction of the image having the predetermined shape from the first display portion to the second display portion coincides with a direction of riding in the vehicle of the user.

* * * * *